US007740070B2

(12) United States Patent
Santra et al.

(10) Patent No.: US 7,740,070 B2
(45) Date of Patent: Jun. 22, 2010

(54) WELLBORE SERVICING COMPOSITIONS COMPRISING A DENSITY SEGREGATION INHIBITING COMPOSITE AND METHODS OF MAKING AND USING SAME

(75) Inventors: Ashok K. Santra, Duncan, OK (US); Feng Liang, Duncan, OK (US); Russell M. Fitzgerald, Waurika, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 12/139,595

(22) Filed: Jun. 16, 2008

(65) Prior Publication Data

US 2009/0308611 A1 Dec. 17, 2009

(51) Int. Cl.
*E21B 33/13* (2006.01)
(52) U.S. Cl. ...................................... 166/300
(58) Field of Classification Search ........................ None
See application file for complete search history.

(56) References Cited

U.S. PATENT DOCUMENTS

| 2,700,655 | A | 1/1955 | Endres et al. |
| 2,995,514 | A | 8/1961 | Jordan et al. |
| 4,584,327 | A | 4/1986 | Sutton |
| 4,935,060 | A | 6/1990 | Dingsoyr |
| 5,213,161 | A | 5/1993 | King et al. |
| 5,220,960 | A | 6/1993 | Totten et al. |
| 5,275,655 | A | 1/1994 | Grunau et al. |
| 5,281,270 | A | 1/1994 | Totten et al. |
| 5,298,069 | A | 3/1994 | King et al. |
| 5,525,678 | A | 6/1996 | Mink et al. |
| 5,779,787 | A | 7/1998 | Brothers et al. |
| 5,913,364 | A | 6/1999 | Sweatman |
| 6,059,034 | A | 5/2000 | Rickards et al. |
| 6,147,173 | A | 11/2000 | Holtcamp |
| 6,167,967 | B1 | 1/2001 | Sweatman |
| 6,180,573 | B1 | 1/2001 | Nattier et al. |
| 6,180,735 | B1 | 1/2001 | Wenzel |
| 6,207,606 | B1 | 3/2001 | Lue et al. |
| 6,211,105 | B1 | 4/2001 | Holtcamp |
| 6,242,545 | B1 | 6/2001 | Jejelowo et al. |
| 6,245,705 | B1 | 6/2001 | Kissin |
| 6,245,868 | B1 | 6/2001 | Agapiou et al. |
| 6,248,845 | B1 | 6/2001 | Loveday et al. |
| 6,258,757 | B1 | 7/2001 | Sweatman et al. |
| 6,271,323 | B1 | 8/2001 | Loveday et al. |
| 6,274,684 | B1 | 8/2001 | Loveday et al. |
| 6,290,001 | B1 | 9/2001 | West et al. |
| 6,300,436 | B1 | 10/2001 | Agapiou et al. |
| 6,339,134 | B1 | 1/2002 | Crowther et al. |
| 6,340,730 | B1 | 1/2002 | Murray et al. |
| 6,346,586 | B1 | 2/2002 | Agapiou et al. |
| 6,359,072 | B1 | 3/2002 | Whaley |
| 6,380,328 | B1 | 4/2002 | McConville et al. |
| 6,406,789 | B1 | 6/2002 | McDaniel et al. |
| 6,420,580 | B1 | 7/2002 | Holtcamp et al. |
| 6,457,524 | B1 | 10/2002 | Roddy |
| 6,508,305 | B1 | 1/2003 | Brannon et al. |
| 6,516,884 | B1 | 2/2003 | Chatterji et al. |
| 6,632,527 | B1 | 10/2003 | McDaniel et al. |
| 6,641,660 | B1 | 11/2003 | Chatterji et al. |
| 6,664,215 | B1 | 12/2003 | Tomlinson |
| 6,832,651 | B2 | 12/2004 | Ravi et al. |
| 6,889,767 | B2 | 5/2005 | Reddy et al. |
| 6,892,814 | B2 | 5/2005 | Heathman et al. |
| 6,907,929 | B2 | 6/2005 | Leroy-Delage et al. |
| 6,964,302 | B2 | 11/2005 | Luke et al. |
| 6,989,057 | B2 | 1/2006 | Getzlaf et al. |
| 7,007,755 | B2 | 3/2006 | Reddy et al. |
| 7,044,222 | B2 | 5/2006 | Tomlinson |
| 7,048,054 | B2 | 5/2006 | Heathman et al. |
| 7,077,203 | B1 | 7/2006 | Roddy et al. |
| 7,086,466 | B2 | 8/2006 | Roddy |
| 7,138,446 | B2 | 11/2006 | Reddy et al. |
| 7,140,439 | B2 | 11/2006 | Luke et al. |

(Continued)

FOREIGN PATENT DOCUMENTS

CA          1085531 A     9/1980

(Continued)

OTHER PUBLICATIONS

Cavanagh, P., et al., "Self-healing cement—novel technology to achieve leak-free wells," SPE/IADC 105781, Feb. 20-22, 2007, pp. 1-13, SPE/IADC Drilling Conference, Amsterdam, The Netherlands.

(Continued)

*Primary Examiner*—Zakiya W. Bates
(74) *Attorney, Agent, or Firm*—Craig W. Roddy; Conley Rose, P.C.

(57) ABSTRACT

A method of servicing a wellbore comprising placing a wellbore servicing fluid comprising a density segregation inhibitor composite into the wellbore, wherein the density segregation inhibitor composite comprises a high density additive and a low density additive; and wherein the high density additive comprises barium sulfate, iron oxide, manganese oxide, or combinations thereof. A method of inhibiting segregation of particles in a wellbore servicing fluid comprising preparing a composite material comprising a high density additive and a low density additive, wherein the low density additive comprises an elastomer which can increase in volume by greater than about 300% based on its original volume when contacted with a fluid.

20 Claims, 4 Drawing Sheets

U.S. PATENT DOCUMENTS

| | | | |
|---|---|---|---|
| 7,144,456 B2 | 12/2006 | Reddy et al. | |
| 7,147,067 B2 | 12/2006 | Getzlaf et al. | |
| 7,150,321 B2 | 12/2006 | Luke et al. | |
| 7,174,962 B1 | 2/2007 | Roddy et al. | |
| 7,213,646 B2 | 5/2007 | Roddy et al. | |
| 7,255,738 B2 | 8/2007 | Semmens | |
| 7,267,291 B2 | 9/2007 | Bradbury et al. | |
| 7,282,093 B2 | 10/2007 | Brothers et al. | |
| 7,312,271 B2 | 12/2007 | Chen et al. | |
| 7,328,756 B2 | 2/2008 | Reddy et al. | |
| 7,341,106 B2 | 3/2008 | Reddy et al. | |
| 7,350,573 B2 | 4/2008 | Reddy | |
| 7,350,575 B1 | 4/2008 | Lewis et al. | |
| 7,350,576 B2 | 4/2008 | Robertson et al. | |
| 7,353,870 B2 | 4/2008 | Roddy et al. | |
| 7,528,096 B2 | 5/2009 | Brannon et al. | |
| 2003/0205174 A1* | 11/2003 | Carter, Jr. | 106/724 |
| 2004/0055748 A1 | 3/2004 | Reddy et al. | |
| 2004/0144537 A1 | 7/2004 | Reddy et al. | |
| 2005/0061206 A1 | 3/2005 | Reddy et al. | |
| 2005/0113262 A1 | 5/2005 | Ravi et al. | |
| 2006/0004126 A1 | 1/2006 | Park et al. | |
| 2007/0062691 A1 | 3/2007 | Reddy et al. | |
| 2007/0137528 A1 | 6/2007 | Le Roy-Delage et al. | |
| 2007/0151484 A1 | 7/2007 | Reddy et al. | |
| 2007/0151730 A1 | 7/2007 | Reddy et al. | |
| 2007/0204765 A1 | 9/2007 | Le Roy-Delage et al. | |
| 2007/0209795 A1 | 9/2007 | Gupta | |
| 2008/0099203 A1 | 5/2008 | Mueller et al. | |
| 2009/0038800 A1* | 2/2009 | Ravi et al. | 166/292 |

FOREIGN PATENT DOCUMENTS

| | | |
|---|---|---|
| WO | 2004007867 A1 | 1/2004 |
| WO | 2006085012 A1 | 8/2006 |
| WO | 2007074330 A1 | 7/2007 |
| WO | 2008033838 A2 | 3/2008 |
| WO | 2009143998 A1 | 12/2009 |
| WO | 2009153547 A1 | 12/2009 |

OTHER PUBLICATIONS

Onan, D. D., et al., "Elastomeric composites for use in well cementing operations," SPE 26572, 68th Annual Technical Conference and Exhibition of the Society of Petroleum Engineers, Houston, Texas, Oct. 3-6, 1993, pp. 593-608, Society of Petroleum Engineers, Inc.

Manas-Zloczower, Ica, et al., "Mixing and compounding of polymers, " Jul. 1994, 1 page, Hanser Gardner Publications.

White, James L., "Twin screw extrusion: technology and principles" 1991, 1 page, Hanser Publishers, New York.

* cited by examiner

US 7,740,070 B2

WELLBORE SERVICING COMPOSITIONS COMPRISING A DENSITY SEGREGATION INHIBITING COMPOSITE AND METHODS OF MAKING AND USING SAME

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

1. Technical Field

The present disclosure generally relates to wellbore servicing fluids. More particularly, this disclosure relates to wellbore servicing fluids comprising a composite material and methods of making and using same.

2. Background

Natural resources such as gas, oil, and water residing in a subterranean formation or zone are usually recovered by drilling a wellbore down to the subterranean formation while circulating a drilling fluid in the wellbore. After terminating the circulation of the drilling fluid, a string of pipe, e.g., casing, is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. The main objectives of primary cementing operations include zonal isolation to prevent migration of fluids in the annulus, support for the casing or liner string, and protection of the casing string from corrosive formation fluids. Subsequent secondary cementing operations may also be performed to repair primary-cementing problems and/or to treat conditions arising after the wellbore has been constructed.

A particular challenge in cementing is the development of satisfactory mechanical properties in a cement slurry within a reasonable time period. During the life of a well, the subterranean cement sheath undergoes numerous strains and stresses as a result of a variety of factors such as alterations in temperature and pressure. The ability to withstand these strains and stresses is directly related to the mechanical properties of the cement. The mechanical properties of a cement are often characterized using parameters such as compressive strength, tensile strength, Young's Modulus, Poisson's Ratio, and the like. These properties may be modified by the inclusion of additives. For example, weighting agents can be used to increase slurry densities in high pressure formations to ensure the set cement sheath has a sufficient compressive strength and may exhibit long-term structural integrity. In some instances, fluid loss additives such as synthetic polymers, which are typically lower density materials compared to the weighting agent additives described previously, may be included to retain water and maintain one or more user-desired slurry properties One challenge to the inclusion of such additives in the wellbore servicing fluids is the effect the range of densities of the additives on the homogeneity of the fluid. The differing densities of additives may result in non-uniform density distribution in the wellbore servicing fluids (e.g., cement slurries). For example, high density additives may tend to settle to the lower portion of the cement slurry while low density additives tend to float around the upper portion. Thus, a need exists for a methodology to inhibit and/or eliminate the settling and/or floating of materials (e.g., additives) within a wellbore servicing fluid.

SUMMARY

Disclosed herein is a method of servicing a wellbore comprising placing a wellbore servicing fluid comprising a density segregation inhibitor composite into the wellbore, wherein the density segregation inhibitor composite comprises a high density additive and a low density additive; and wherein the high density additive comprises barium sulfate, iron oxide, manganese oxide, or combinations thereof.

Also disclosed herein is a method of inhibiting segregation of particles in a wellbore servicing fluid comprising preparing a composite material comprising a high density additive and a low density additive, wherein the low density additive comprises an elastomer which can increase in volume by greater than about 300% based on its original volume when contacted with a fluid.

Further disclosed herein is a method of servicing a wellbore comprising placing a lightweight cement composition comprising a density segregation inhibitor composite into the wellbore, and allowing the cement composition to set wherein the lightweight cement has a density of from about 5 ppg to about 12 ppg; wherein the density segregation inhibitor composite comprises a high density additive and a low density additive, and wherein the high density additive comprises barium sulfate, iron oxide, manganese oxide, or combinations thereof.

Further disclosed herein is a method of servicing a wellbore comprising placing a wellbore servicing fluid comprising a composite material comprising an iron oxide and a styrene butadiene styrene block copolymer into the wellbore.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION

Figure 1:
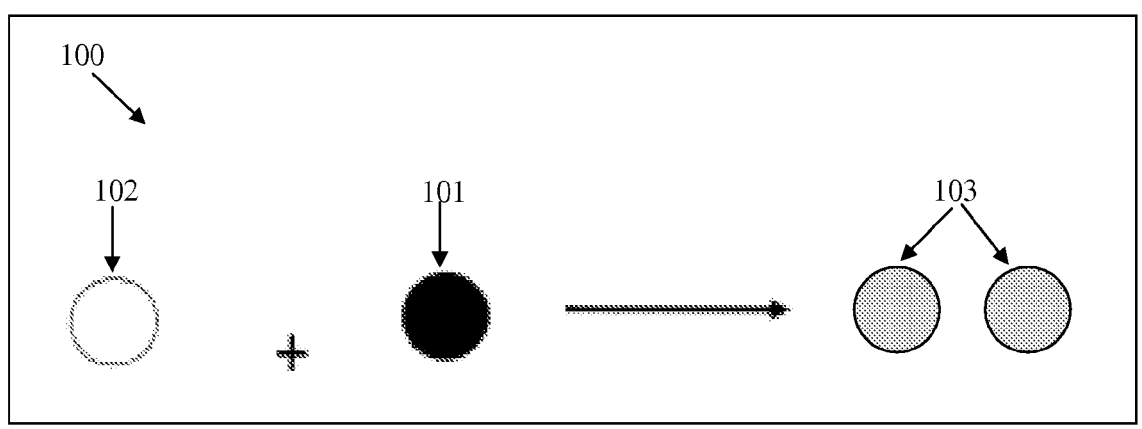
FIG. 1 is a schematic illustration of a method of preparing a density segregation inhibiting composite (DSIC).

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are density segregation inhibiting composites (DSICs) comprising at least one high density additive and at least one low density additive and methods of making and using same. Herein "composite materials" refer to materials which are made from two or more constituent materials having differing physical and/or chemical properties and which remain separate and distinct on a macroscopic level within the finished material. One or more DSICs may be included in a wellbore servicing fluid as described herein. The DSIC may be used to prevent density segregation problems (i.e., setting and/or floating) that may occur in wellbore servicing fluids.

As used herein, a "wellbore servicing fluid" refers to a fluid used to drill, complete, work over, fracture, repair, or in any way prepare a wellbore for the recovery of materials residing in a subterranean formation penetrated by the wellbore. It is to be understood that "subterranean formation" encompasses both areas below exposed earth and areas below earth covered by water such as ocean or fresh water. Examples of servicing fluids include, but are not limited to cement slurries, drilling fluids or muds, spacer fluids, fracturing fluids or completion fluids, and the like. In an embodiment, the wellbore servicing fluid comprises a cementitious material and the DSIC may inhibit segregation of additives of differing densities and promote a more uniform density throughout the cement composition and the resulting set cement sheath.

The wellbore servicing fluids comprising a DSIC of the type described herein may display desirable Theological characteristics such as for example a more uniform density when compared to otherwise similar wellbore servicing fluids lacking the DSIC.

In an embodiment, a wellbore servicing fluid comprises a DSIC, wherein the DSIC comprises at least one high density additive and at least one low density additive. The amount of DSIC present in the servicing fluid may be from about 2 wt. % to about 70 wt. %, alternatively from about 2 wt. % to about 60 wt. %, alternatively from about 3 wt. % to about 50 wt. % based upon the total weight of the servicing fluid.

In an embodiment, the DSIC comprises at least one high density additive. Herein, the high density additive refers to an additive with a specific gravity of from about 3.2 to about 7, alternatively from about 2.8 to about 6, alternatively from about 2.6 to about 5. Specific gravity is defined as the ratio of the density of a given material to the density of water, when both are at the same temperature. The higher the specific gravity, the denser the material, thus the increased tendency of the material to sink or settle toward the bottom part of the wellbore servicing fluids.

High density additives (e.g., weighting agents) may be included in wellbore servicing fluids to increase slurry density, control high formation pressure, improve displacement, and the like. In an embodiment, the high density additives are weighting agents which may comprise any material having a specific gravity in the disclosed ranges that is compatible with the other components of the wellbore servicing fluid. Examples of suitable weighting agents include without limitation barite, hematite, hausmannite, calcium carbonate, siderite, ilmenite, or combinations thereof. In an embodiment, the weighting agents comprise barite, hematite, hausmannite, or combinations thereof.

In an embodiment, the high density additive comprises barite. Barite is a nonmetallic mineral of barium sulfate ($BaSO_4$) with a specific gravity range of from about 4.3 to about 5. Examples of barites suitable for use in this disclosure include without limitation BAROID 41 and SWEEP-WATE, which are commercially available from Halliburton Energy Services, Inc.

In another embodiment, the high density additive comprises hematite. Hematite is a mineral form of iron (III) oxide ($Fe_2O_3$) with a specific gravity range of from about 4.9 to about 5.3. Examples of hematites suitable for use in this disclosure include without limitation HI DENSE #3 weighting agent and HI DENSE #4 weighting agent, which are commercially available from Halliburton Energy Services, Inc.

In yet another embodiment, the high density additive comprises hausmannite. Hausmannite is a complex oxide of manganese containing both di- and tri-valent manganese ($Mn^{2+} Mn^{3+}_2 O_4$) with a specific gravity of about 4.8. An example of hausmannites suitable for use in this disclosure includes without limitation MICROMAX weighting agent which is commercially available from Halliburton Energy Services, Inc.

The high density additive (e.g., weighting agent) in the DSIC may be present in an amount effective to produce the desired specific gravity of the DSIC. In an embodiment, the high density additive may be present in the DSIC in an amount of from about 5 wt. % to about 90 wt. % based on the total weight of the DSIC, alternatively from about 10 wt. % to about 88 wt. %, alternatively from about 15 wt. % to about 85 wt. %.

In an embodiment, the DSIC comprises at least one low density additive. Herein a low density additive refers to an additive with a specific gravity of from about 0.6 to about 2.6, alternatively from about 0.65 to about 1.6, alternatively from about 0.7 to about 1.5. The low density additive may be either hydrophobic or hydrophilic in nature.

In one embodiment, the low density additive may be further characterized as a material at least a portion of which may undergo a phase transition from a solid to a liquid molten state upon exposure to the reaction conditions to be described in more detail later herein and then resolidify when no longer exposed to those reaction conditions. Such low density additives may have a melting temperature ($T_m$) or glass transition temperature ($T_g$) of from about 100° F. to about 700° F., alternatively from about 120° F. to about 500° F., alternatively from about 150° F. to 400° F. Herein $T_g$ and $T_m$ refer to temperatures at which the material undergoes a phase transition from a solid to a liquid. The phase transition temperature is commonly termed the glass transition temperature ($T_g$) when referring to amorphous materials and is commonly termed the melting point ($T_m$) when referring to crystalline materials. Specifically, $T_g$ is the temperature at which amorphous polymers undergo a second order phase transition from a brittle, glassy amorphous solid to a rubbery, soft, amorphous solid. A further increase in temperature may lead to a change of the rubbery, soft, amorphous solid to a softer ductile material and in some cases the material may become a viscous liquid.

In an embodiment, the low density additive comprises an elastomer. The elastomer may include any suitable elastomeric material that can melt, cool, and solidify onto a high density additive of the type described previously herein. In an embodiment, the elastomer may be a thermoplastic elastomer (TPE). Without limitation, examples of monomers suitable for use in forming TPEs include dienes such as butadiene, isoprene and hexadiene, and/or monoolefins such as ethylene, butenes, and 1-hexene. In an embodiment, the TPE includes polymers comprising aromatic hydrocarbon monomers and aliphatic dienes. Examples of suitable aromatic hydrocarbon monomers include without limitation styrene, alpha-methyl styrene, and vinyltoluene. In an embodiment, the TPE is a crosslinked or partially crosslinked material. In such embodiment, the low density additive may be a styrene butadiene block copolymer, alternatively a styrene butadiene styrene (SBS) block copolymer. In another embodiment, the low density additive may be a hydrogenated form of a SBS having radial or linear polymer chain architecture. Alternatively, the low density additive may be a styrene-butadiene random copolymer (SBR) having radial or linear polymer chain architecture wherein the elastomer is not a TPE. In other embodiments, the low density additive is a polyolefin grafted with polar monomers, for example maleic anhydride, sulfonic acid or sulfonate groups.

The low density additive may have any particle size suitable for forming the DSIC. In an embodiment, the low density additive may have particle sizes from about 3.5 mesh to about 635 mesh, alternatively from about 18 mesh to about 400 mesh, and alternatively from about 35 mesh to about 200 mesh.

Examples of suitable low density additives include without limitation WELLLIFE 665, FINAPRENE 411, FINAPRENE 435, FINAPRENE 401, and FINACLEAR thermoplastic elastomers, which are SBS elastomers commercially available from Total Petrochemical USA, Inc. or KRATON elastomers which are also SBS elastomers commercially available from Kraton Polymers.

The low density additive may be present in an amount effective to produce the desired specific gravity of the DSIC. In an embodiment, the low density additive may be present in the DSIC in an amount of from about 90% to about 10% based on the total weight of the DSIC, alternatively from about 80% to about 15%, alternatively from about 75% to about 20%.

In an embodiment, a method of preparing a DSIC is illustrated in FIG. 1. Referring to FIG. 1, a method 100 of preparing a DSIC 103 comprises contacting a high density additive 101 with a low density additive 102. In an embodiment, the contacting of the high density additive 101 with the low density additive 102 is carried out by melt mixing the components at a temperature equal to or greater than the $T_m$ or $T_g$ of the low density additive 102. Upon heating, at least a portion of the low density additive undergoes a phase transition from a solid to a liquid. Upon cooling, some portion of the molten low density additive may solidify onto the high density additive to produce a composite material.

In an alternative embodiment, the DSIC is prepared by polymerization of the low density additive onto the high density additive. In such embodiments the low density additive comprises a polymeric material which may be formed by placing one or more monomers (e.g., diene, monoolefin, etc,) in a suitable reaction vessel in the presence of a catalyst (e.g., Ziegler-Natta, metallocene, etc.) and under suitable reaction conditions for polymerization thereof. Any suitable equipment and processes for polymerizing the olefin into a polymer may be used. For example, such processes may include solution phase, gas phase, slurry phase, bulk phase, high pressure processes or combinations thereof. Such processes are described in detail in U.S. Pat. Nos. 5,525,678, 6,420,580, 6,380,328, 6,359,072, 6,346,586, 6,340,730, 6,339,134, 6,300,436, 6,274,684, 6,271,323, 6,248,845, 6,245,868, 6,245,705, 6,242,545, 6,211,105, 6,207,606, 6,180,735 and 6,147,173, which are incorporated herein by reference in their entirety.

In an embodiment, the polymer is formed by a slurry phase polymerization process. Slurry phase processes generally include forming a suspension of solid, particulate polymer in a liquid polymerization medium, to which monomers and optionally hydrogen, along with catalyst, are added. The suspension (which may include diluents) may be intermittently or continuously removed from the reactor where the volatile components can be separated from the polymer and recycled, optionally after a distillation, to the reactor. The liquefied diluent employed in the polymerization medium may include a $C_3$ to $C_7$ alkane (e.g., hexane or isobutene). The medium employed is generally liquid under the conditions of polymerization and relatively inert. A bulk phase process is similar to that of a slurry process. However, a process may be a bulk process, a slurry process or a bulk slurry process.

In an embodiment, an inert high density additive may be included in the reaction zone and situated so as to allow the formed polymer to contact the high density additive and form a DSIC. In an alternative embodiment, polymerization of the monomer may be carried out and prior to pelletization or processing of the liquid polymer to a particulate state a suitable amount of high density additive may be contacted with the polymer so as to form DSIC. In either embodiment, the DSIC may be further dried to form DSIC particulates. The resulting DSIC particulates may be a composite material wherein the low density additive has formed in, on, and/or around the high density additive.

The ratio of high density additive to low density additive used to form the DSIC may be determined by one of ordinary skill in the art with the benefits of this disclosure to provide a user-desired specific gravity. An estimate of the final composite density can be calculated by dividing the total starting volume of the low and high density additive to the starting total weight of the low and high density additive. However, one of ordinary skill in the art may obtain the actual density of the composite using any suitable technique such as standard pycnometry. As will be understood by one of ordinary skill in the art, there may be a slight volume loss or gain as compared to the initial total volume due to the structural arrangement of low density and high density additive while in the composite. The composite materials are expected to have homogeneity of about the size domain of a few microns.

Figure 4:
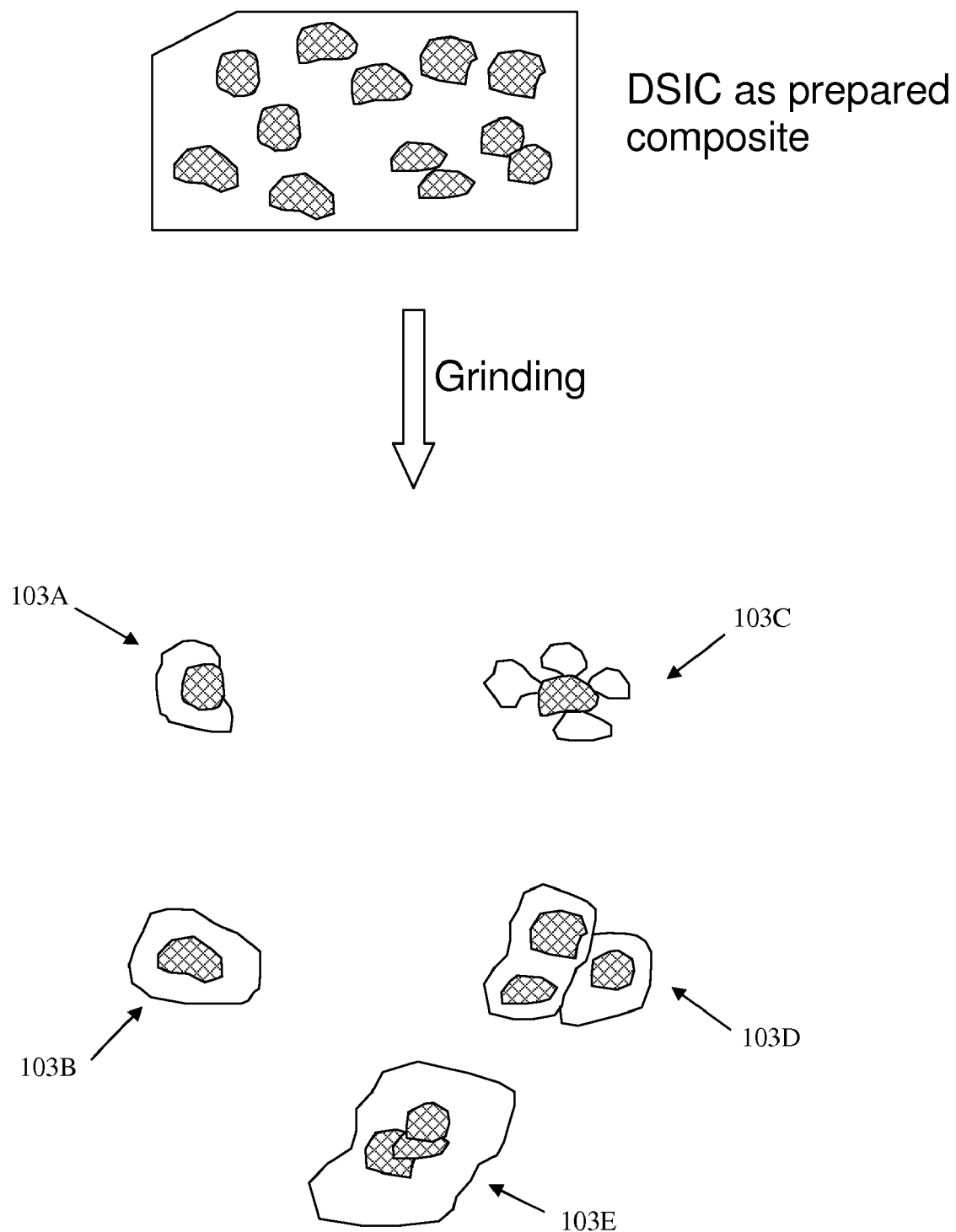
FIG. 4 depicts possible configurations of the density segregating composite.

The DSIC as prepared composite may be further processed for example by grinding, which may result in a variety of DSIC configurations. FIG. 4 depicts possible configurations of the DSIC after grinding. The DSIC may comprise a low density additive that partially encapsulates a high density additive as shown in FIG. 4 103A. Alternatively, the low density additive may completely surround the high density additive FIG. 4 103B. In another embodiment, several particles comprising the low density additive may associate with a single particle of the high density additive, FIG. 103C. In yet another embodiment, the low density additive may associate with a plurality of high density additives, FIG. 4 103D. In yet another embodiment, the low density additive may surrounds more than high density additives as shown in FIG. 4 103E.

In an embodiment, the DSIC is by chemically bonding the surfaces of the high and low density additives. For example, one or more functional groups can be incorporated onto the surface of the high density additive, the low density additive, or both. Such functional groups may react to chemically adhere the high density additive and low density additive. For example, the additives may comprise moieties that crosslink, condense, hydrolyze, or otherwise react to produce one or more chemical bonds between the high density additive and low density additive. Parameters such as the type, number, and nature of bonds produced will influence the extent of the chemical bonding between the additives and may be chosen by one of ordinary skill in the art with the benefits of this disclosure to meet a process-desired objective In an embodiment, the DSIC comprises a low density additive such as SBS, and a high density additive such as hematite, wherein the ratio of the low density additive to the high density additive may be from about 90:10 to about 88:12, alternatively from about 85:15 to about 50:50, alternatively from about 20:80 to about 15:85.

In another embodiment, the DSIC comprises a low density additive such as SBS and a high density additive such as hausmannite, wherein the ratio of the low density additive to the high density additive may be from about 90:10 to about 88:12, alternatively from about 85:15 to about 50:50, alternatively from about 20:80 to about 15:85

Optionally, the composite material may be further processed to achieve a desired composite particle size or particle size distribution (e.g., processes such as grinding and/or separating, e.g., screening). For example, the resulting DSIC 103 may be pelletized or grounded to form pellets, spheres, beads, etc. The size of the pellets may vary within the DSIC and is typically defined in terms of mesh size. In an embodiment, the DSIC may have a particle size distribution of from about 0.1 microns to about 3000 microns, alternatively from about 10 microns to about 2000 microns, alternatively from about 50 microns to about 1000 microns. The DSIC may be further characterized by an aspect ratio of from about 10 to about 1, alternatively from about 5 to about 1, alternatively from about 2 to about 1. In an embodiment, the DSIC of the type described herein may have a specific gravity of from about 0.8 to about 4.5, alternatively from about 0.85 to about 4, alternatively from about 0.9 to about 4.

In an embodiment, the wellbore servicing fluids comprise a cementitious material. The cementitious material may be a hydraulic cement comprising calcium, aluminum, silicon, oxygen, and/or sulfur. Examples of suitable cementitious material include Portland cements (e.g., classes A, C, G, and H Portland cements), construction cements (e.g., type I and II), pozzolanic cements, gypsum cements, shale cements, acid/base cements, phosphate cements, high alumina content cements, silica cements, high alkalinity cements, magnesia cements, fly ash cement, zeolite cement systems, cement kiln dust cement systems, slag cements, micro-fine cement, metakaolin, Sorel cement which typically comprises magnesium oxide and a chloride or phosphate salt which together form for example magnesium oxychloride, or combinations thereof. Other examples of cements are disclosed in U.S. Pat. Nos. 6,457,524; 7,077,203; and 7,174,962, each of which is incorporated herein by reference in its entirety. Examples of magnesium oxychloride cements are disclosed in U.S. Pat. Nos. 6,664,215 and 7,044,222, each of which is incorporated herein by reference in its entirety. The cementitious material may be present in the wellbore servicing fluid in an amount of from about 35 wt. % to about 80 wt. % by weight of the wellbore servicing fluid, alternatively from about 40 wt. % to about 78 wt. %, alternatively from about 45 wt. % to about 75 wt. %.

In an embodiment, the wellbore servicing fluids include a sufficient amount of water to form a pumpable slurry. The water may be fresh water or salt water, e.g., an unsaturated aqueous salt solution or a saturated aqueous salt solution such as brine or seawater. The water may be present in the wellbore servicing fluids in an amount of from about 10 wt. % to about 200 wt. % by weight of cement (bwoc), alternatively from about 50 wt. % to about 200 wt. %, alternatively from about 50 wt. % to about 180 wt. %.

As deemed appropriate by one skilled in the art with the aid of this disclosure, additional additives, other than previously described herein, may be introduced to the wellbore servicing fluid for improving or changing its properties. Examples of such additives include salts, accelerators, set retarders (e.g., HR-5, which is commercially available from Halliburton Energy Services, Inc.), foamers (i.e., nitrogen injection or air injection), defoamers (e.g., D-AIR 3000L defoamer, which is commercially available from Halliburton Energy Services, Inc.), fluid loss additive (e.g., HALAD 344 additive, which is commercially available from Halliburton Energy Services, Inc.), crystalline silica (e.g., SSA-1 silica flour, which is commercially available from HES), dispersants, vitrified shale, formation conditioning agents, lost circulation materials, thixotropic agents, suspension aids, mechanical property modifying additives (e.g., carbon fibers, glass fibers, metal fibers, minerals fibers, latexes, etc.), expanding additives from a chemical reaction or physical mechanism (i.e., in-situ hydrogen gas production), gas, fluid absorbing materials, resins, aqueous superabsorbers, non-aqueous superabsorbers, viscosifying agents, suspending agents, dispersing agents, inert particulates, microbeads, or combinations thereof. In an embodiment, the additive comprises microbeads, gas, foamers, or combinations thereof for use in lightweight cementing applications that will be described later herein.

These additives may be included singularly or in combination and may be introduced to the wellbore servicing fluids concurrent with or after the addition of the DSIC. Methods for introducing these additives and their effective amounts are known to one of ordinary skill in the art with the aid of this disclosure.

In an embodiment, a wellbore servicing fluid comprising a DSIC of the type described herein may be prepared by combining the DSIC comprising at least one high density additive and at least one low density additive, the cementitious material, water, and optionally one or more additives. For example, the additive may be microbeads, foamers, gas, or combinations thereof. The components of the wellbore servicing fluid may be combined using any mixing device compatible with the fluid, for example a bulk mixer. In an embodiment, the components of the wellbore servicing fluid are combined at the site of the wellbore. Alternatively, the components of the wellbore servicing fluid are combined off-site and then later used at the site of the wellbore. In an embodiment, the DSIC is dry blended with the dry cement at a location remote from the well site, subsequently transported to the well site, formed into a pumpable slurry, and placed down a wellbore. Alternatively, the DSIC is added to water which is later contacted with the cementitious material. Alternatively, the DSIC is injected into the slurry during the cementing operation.

The wellbore servicing fluids comprising a DSIC of the type described herein may display expanded and improved utility when compared to an otherwise similar wellbore servicing fluid in the absence of the DSIC.

Figure 2:
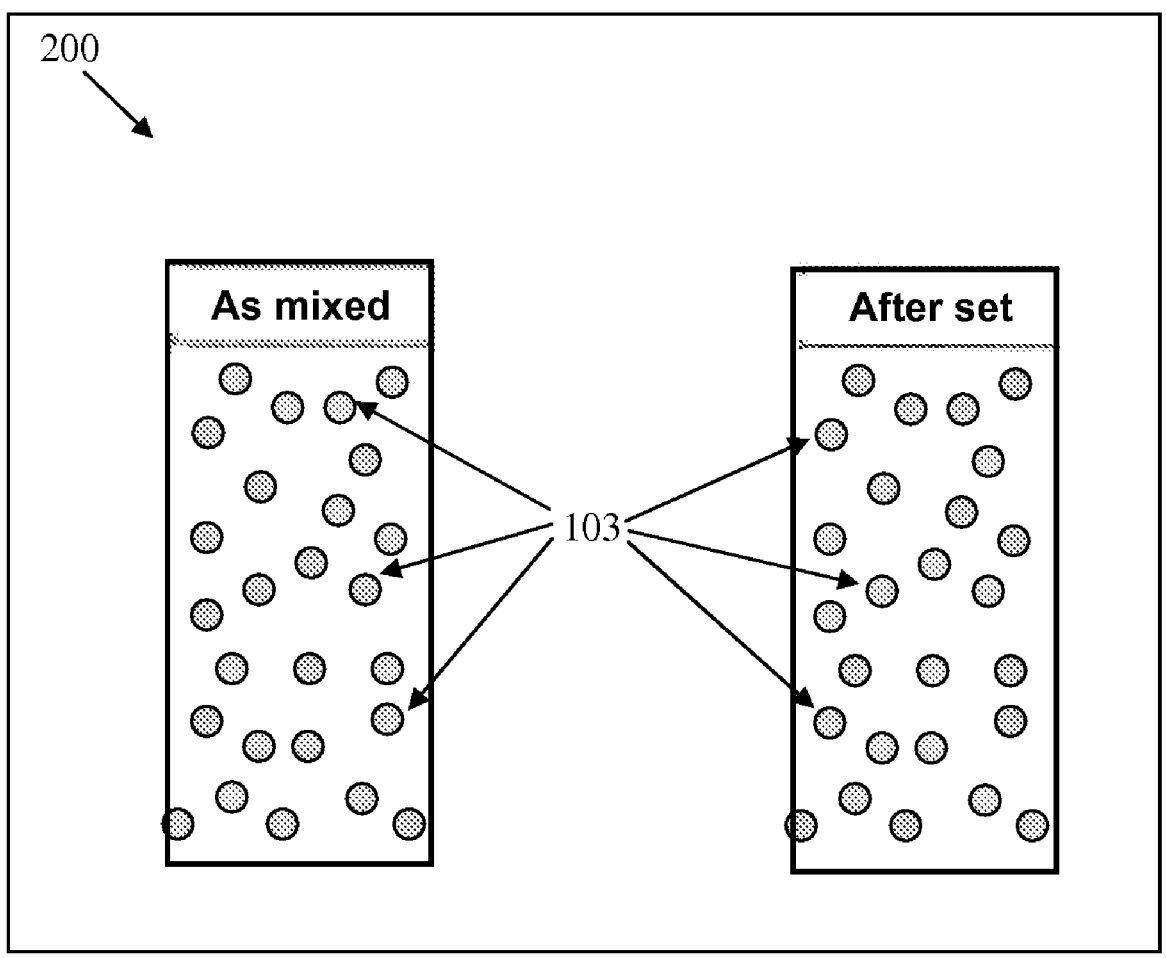
FIG. 2 is a schematic illustration a wellbore servicing fluid comprising a DSIC as mixed and after set.
Figure 3:
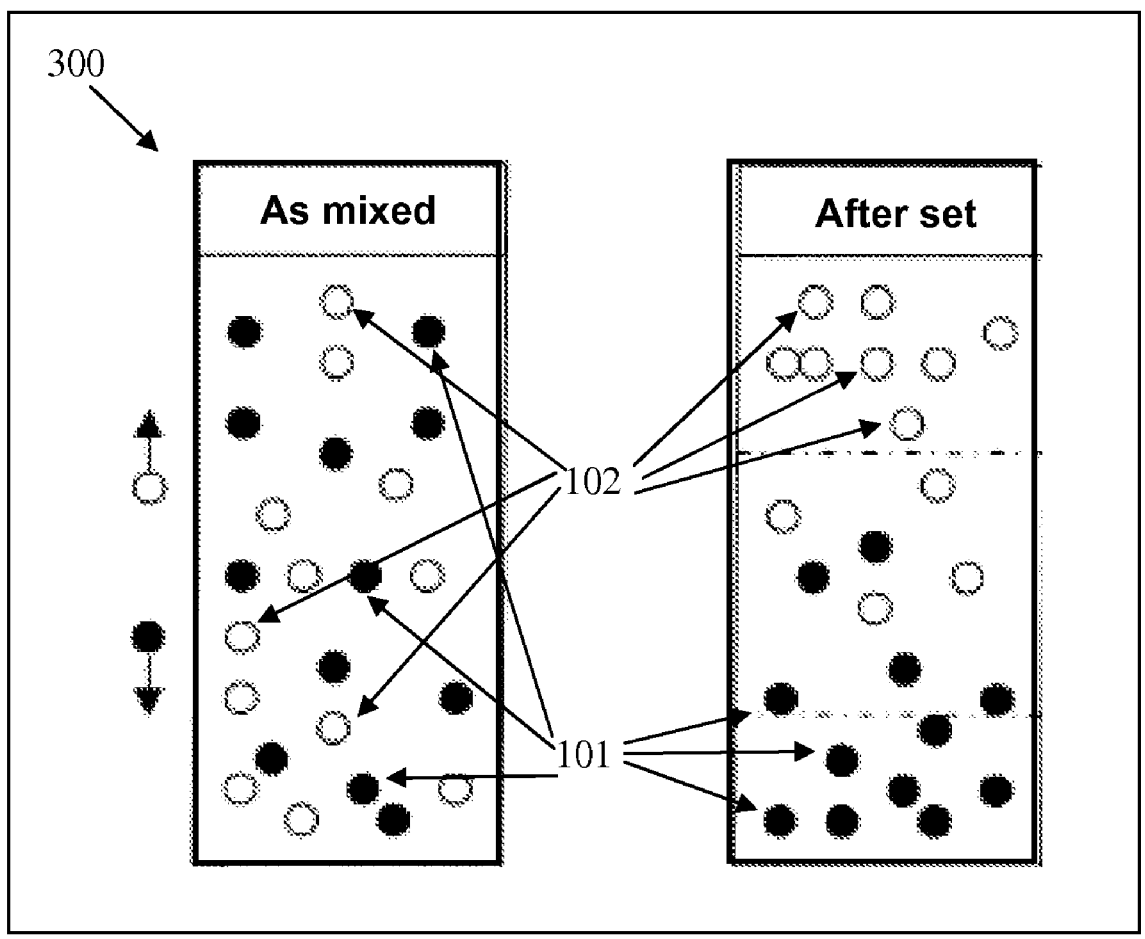
FIG. 3 is a schematic illustration of a wellbore servicing fluid comprising high density and lower density materials in the absence of a DSIC as mixed and after set.

In an embodiment, the wellbore servicing fluid comprising a DSIC of the type disclosed herein may display a more uniform density when compared to an otherwise similar wellbore servicing fluid lacking the DSIC. For example, referring to FIG. 2, an illustration of the distribution of the DSICs 103 in a wellbore servicing fluid 200 (e.g., a cement slurry) is given. Referring to FIG. 2, the DSICs 103 are distributed uniformly throughout the wellbore servicing fluid as mixed and after set. In contrast, FIG. 3 illustrates the distribution of high density additives 101 and low density additives 102 in a wellbore servicing fluid 300 (e.g., cement slurry) as mixed and after set in the absence of a DSIC. Referring to FIG. 3, the high density additives 101 and the low density additives 102 are uniformly distributed as mixed and prior to set. However, after placement of the wellbore servicing fluid and prior to setting, the additives segregate such that the high density additives 101 sink toward the lower portion of the wellbore servicing fluid 300 while the low density additives 102 float to the upper portion of the wellbore servicing fluid 300. The result is a non-uniform density distribution throughout the set material.

The density uniformity may be measured by using a BP settling test wherein a sample wellbore servicing fluid (e.g., cement composition) is sectioned about equally into an upper, middle, and lower portion and the density of each portion is determined. BP-settling tests measure the amount of settling that occurs in a cement slurry from the time it is placed until the cement and is determined in accordance with API RB 10B Recommended Practices for Testing Oil Well Cements and Cement Additives the relevant portions of which are incorporated by reference herein. Specifically, the test involves preconditioning the cement slurry at the bottom hole circulating temperature (BHCT) in a high-pressure/high temperature curing chamber and curing the cement at the specified temperature. After the sample is set, the mold is removed and the column of cement is removed. The cement column is cut into segments and the density of each segment is measured. In an embodiment, wellbore servicing fluids comprising a DSIC of the type described herein further comprise a composition which sets upon standing under typical wellbore condition. In such embodiments, the set composition when sectioned into about equal upper, middle, and lower portions may display a vertical variation in density of from about 0.1% to about 5%, alternatively from about 0.2% to about 3%, alternatively from about 0.3% to about 2%. In alternative embodiments, the wellbore servicing composition may not set upon standing. In such embodiments, the wellbore servicing fluid after placement may exhibit a vertical variation in densities in the ranges disclosed previously herein. Such fluids may be pumped and agitated during formation and placement but are then left unagitated (i.e., allowed to stand) for some time period in the wellbore. It is to be understood that the presence of the DSIC in the wellbore servicing fluid may allow for a uniform density or a low variation in the vertical density of the fluid after it has been placed in its intended location and allowed to stand.

In an embodiment, wellbore servicing fluids comprising a DSIC of the type disclosed herein may develop an appreciable compressive strength when placed downhole. Herein the compressive strength is defined as the capacity of a material to withstand axially directed pushing forces. The maximum resistance of a material to an axial force is determined in accordance with API Recommended Practices 10B, Twenty-Second Edition, December 1997. Beyond the limit of the compressive strength, the material becomes irreversibly deformed and no longer provides structural support and/or zonal isolation. The compressive strength a set cement attains is a function of both the cement maturity (or cure time) and the temperature at which setting occurs. Herein the cement maturity or cure time is the time for required for hydration of the cementitious material. The cement maturity specifically refers to the time the cement formulation is allowed to set. In an embodiment, the wellbore servicing fluids comprising the DSIC may develop a compressive strength of from about 100 psi to about 15000 psi, alternatively from about 250 psi to about 12000 psi, alternatively from about 500 psi to about 10000 psi. The compressive strength of the wellbore servicing fluids comprising the DSIC may develop with a cure time of from about 5 hrs to about 28 days, alternatively from about 12 hrs to about 14 days, alternatively from about 18 hrs to about 7 days.

In an embodiment, wellbore servicing fluids comprising a DSIC of the type described herein may display a tensile strength that is comparable to otherwise similar wellbore servicing fluids lacking the DSIC. Tensile strength of a material is the maximum amount of tensile stress that it can be subjected to before failure. Tensile strengths may be measured on dog-bone shaped briquettes according to the procedure described for the test CRD-C260-01 in the U.S. Army Corps of Engineers' Handbook for Concrete and Cement. In an embodiment, the wellbore servicing fluids comprising a DSIC of the type described herein exhibit a tensile strength of from about 10 psi to about 1500 psi, alternatively from about 25 psi to about 1200 alternatively from about 50 psi to about 1000 psi.

In an embodiment, wellbore servicing fluids comprising a DSIC of the type described herein may display a Young's modulus (YM) that is comparable to otherwise similar wellbore servicing fluids lacking the DSIC. Young's modulus, also referred to as modulus of elasticity, is a measure of the stiffness of a given material and is determined in accordance with ASTM D3148-02 (Standard Test Method for Elastic Moduli of Intact Rock Core Specimens in Uniaxial Compression). In an embodiment, the wellbore servicing fluids comprising a DSIC of the type described herein exhibit a Young's modulus of from about $0.01 \times 10^5$ psi to about $4.6 \times 10^6$ psi, alternatively from about $0.02 \times 10^5$ psi to about $3.6 \times 10^6$ psi alternatively from about $0.05 \times 10^5$ psi to about $3.2 \times 10^6$ psi.

In an embodiment, wellbore servicing fluids comprising a DSIC of the type described herein may display a Poisson's Ratio (PR) that is comparable to otherwise similar wellbore servicing fluids lacking the DSIC. Poisson's ratio refers to the ratio of radial strain to axial strain, in the case of unconfined compressive tests, and is determined in accordance with ASTM D3148-02 (Standard Test Method for Elastic Moduli of Intact Rock Core Specimens in Uniaxial Compression). In an embodiment, the wellbore servicing fluids comprising a DSIC of the type described herein have a Poisson's Ratio of from about 0.05 to about 0.4, alternatively from about 0.07 to about 0.3, alternatively from about 0.09 to about 0.28.

In an embodiment, the wellbore servicing fluid comprising a DSIC of the type described herein is used to service a wellbore. Without limitation, servicing the wellbore includes positioning the wellbore servicing fluids comprising the DSIC in the wellbore to isolate the subterranean formation from a portion of the wellbore; to support a conduit in the wellbore; to plug a void or crack in the conduit; to plug a void or crack in a cement sheath disposed in an annulus of the wellbore; to plug an opening between the cement sheath and the conduit; to prevent the loss of aqueous or non-aqueous drilling fluids into loss circulation zones such as a void, vugular zone, or fracture; to be used as a fluid in front of cement slurry in cementing operations; to seal an annulus between the wellbore and an expandable pipe or pipe string; or combinations thereof.

The wellbore servicing fluids comprising the DSIC may be placed into a wellbore as a single stream and activated by downhole conditions to form a set rigid mass. In such an embodiment, the wellbore servicing fluids comprising the DSIC may be placed downhole through the drill bit forming a composition that substantially eliminates lost circulation. Alternatively, the wellbore servicing fluids is formed downhole by the mixing of a first stream comprising one or more wellbore servicing fluids comprising the DSIC components such as for example the DSIC, cement, and other optional additives, and a second stream comprising additional components such as for example water. Methods for introducing compositions into a wellbore to seal subterranean zones are described in U.S. Pat. Nos. 5,913,364; 6,167,967; and 6,258,757, each of which is incorporated by reference herein in its entirety.

In an embodiment, the wellbore servicing fluids comprising the DSIC may be introduced to the wellbore to prevent the loss of aqueous or non-aqueous drilling fluids into loss-circulation zones such as voids, vugular zones, and natural or induced fractures while drilling. The wellbore servicing fluids comprising the DSIC may form a non-flowing, intact mass inside the loss-circulation zone which plugs the zone and inhibits loss of subsequently pumped drilling fluid, which allows for further drilling. For example, the wellbore servicing fluids comprising the DSIC may function as a plug that is placed into an annulus of the wellbore and prepares the formation for placement of a second (e.g., cementitious) composition.

Alternatively, the wellbore servicing fluids comprising the DSIC when placed in a wellbore may be allowed to set such that it isolates the subterranean formation from a different portion of the wellbore. The wellbore servicing fluids comprising the DSIC thus form a barrier that prevents fluids in that subterranean formation from migrating into other subterranean formations. In an embodiment, the wellbore in which the composition is positioned belongs to a multilateral wellbore configuration. It is to be understood that a multilateral wellbore configuration includes at least two principal wellbores connected by one or more ancillary wellbores.

In an embodiment, the wellbore servicing fluids comprising the DSIC may serve as a gravel packing fluid in gravel-packing operations. Herein gravel packing refers to a method commonly utilized to prevent migration of sand into wells and to maintain the integrity of subterranean formations. In gravel packing, a permeable screen is placed against the face of a subterranean formation, followed by packing gravel against the exterior of the screen. The size of the gravel particles used for this purpose are larger than the sand particles but are also small enough to ensure that sand cannot pass through voids between the particles. The gravel is typically carried to the subterranean formation by suspending the gravel in a so-called gravel packing fluid and pumping the fluid to the formation. The screen blocks the passage of the gravel but not the fluid into the subterranean formation such that the screen prevents the gravel from being circulated out of the hole, which leaves it in place. The gravel is separated from the fluid as the fluid flows through the screen leaving it deposited on the exterior of the screen.

In an embodiment, the wellbore servicing fluids comprising the DSIC may be used for plug and abandonment of a well, i.e., to prepare a well to be shut in and permanently isolated. A series of plugs comprising the wellbore servicing fluids comprising the DSIC may be set in the wellbore and tested at each stage for hydraulic isolation.

In an embodiment, the wellbore servicing fluids comprising the DSIC may serve as a spot fluid. A spot fluid herein refers to a small volume or pill of fluid placed in a wellbore annulus that may displace another wellbore servicing fluid such as for example a mud. The spot fluid may act as a settable fluid that when used will displace another wellbore servicing fluid from a crack or crevice in the wellbore and solidify to prevent flow of other wellbore servicing fluids into said cracks or crevices.

In an embodiment, the wellbore servicing fluid comprises a cementitious material which sets and hardens into a cement sheath after placement in a subterranean formation and the DSIC comprises an elastomeric material. Loss of structural integrity of the sheath may create pathways for the flow of fluid through the sheath. In an embodiment, the DSIC comprises an elastomeric material which may swell upon contact with a fluid (e.g., hydrocarbon, water). Upon contact with said fluid, the elastomeric material in the DSIC may increase in size by greater than about 300% based on the original volume of the elastomeric material; alternatively by greater than about 400% alternatively by greater than about 500%. Without wishing to be limited by theory, the swelling of the elastomeric material may be sufficient to obstruct fluid pathways that develop in the sheath as a result of the loss of structural integrity thus reducing the permeability of the sheath. In another embodiment, the elastomeric material is able to self repair in the in the absence of contact with any fluid. In such embodiments, the elastomeric materials may deform at typical wellbore temperatures and pressures to accommodate any deformations in the sheath in which the DSIC is disposed.

In an embodiment, the wellbore servicing fluid comprising the DSIC comprises a lightweight cement slurry. The density of the lightweight cement slurry may be in a range of from about 5 pounds per gallon (ppg) to about 12 ppg. Such cement utilized for cementing across highly depleted zones and weaker formations. Methods of preparing a lightweight cement slurries are known in the art and may involve for example the addition of density reducing additives such as microbeads. Gas, foaming agents and the like. In an embodiment, a DSIC may be included in a lightweight cement to minimize the vertical variation in density.

EXAMPLES

The disclosure having been generally described, the following examples are given as particular embodiments of the disclosure and to demonstrate the practice and advantages thereof. It is understood that the examples are given by way of illustration and are not intended to limit the specification or the claims in any manner.

Example 1

The mechanical properties of cement compositions comprising a DSIC were compared to those of cement compositions lacking a DSIC. Three cement compositions, designated Samples 1-3, were prepared according to API Recommended Practice10B-2 (Formerly 10B), First Edition, July 2005, which is incorporated by reference herein. Each sample contained SSA-1, which is silica flour; HI DENSE #3, which is a cement weighting agent; WELLLIFE 665, which is a styrene-butadiene rubber; HR-5, which is a cement retarder; and D-AIR 3000L, which is an anti-foaming agent; all of which are commercially available from Halliburton Energy Services, Inc. In addition each sample contained Class H cement and water. The weight percentages of each component in the samples are presented in Table 1.

In addition, samples 2 and 3 each contained a DSIC designated Composites 1 and 2 respectively. Composite 1 was prepared by mixing 315 g of HI DENSE #3, with 60 g of WELLLIFE 665, using a BRABENDER mixer. Composite 2 was prepared by mixing 315 g of HI DENSE #3 with 60 g of hydrogenated nitrile butadiene rubber (HNBR) using a BRABENDER mixer. The densities of the slurries of Samples 1-3 were determined to be 17.57 parts per gallon (ppg), 19.01 ppg, and 18.2 ppg respectively.

TABLE 1

| | Sample 1 | Sample 2 | Sample 3 |
|---|---|---|---|
| Water, % bwoc | 56 | 44.5 | 46.2 |
| Cement Class H, % bwoc | 100 | 100 | 100 |
| SSA-1, % bwoc | 35 | 35 | 35 |

TABLE 1-continued

|  | Sample 1 | Sample 2 | Sample 3 |
|---|---|---|---|
| HI DENSE #3, % bwoc | 63 | — | — |
| WELLLIFE 665, % bwoc | 12 | — | — |
| Composite 1, % bwoc | — | 75 | — |
| Composite 2, % bwoc | — | — | 75 |
| HR-5, % bwoc | 0.2 | 0.2 | 0.2 |
| D-AIR-3000L, gal/sk | 0.03 | 0.03 | 0.03 |
| Density, ppg | 17.57 | 19.01 | 18.2 |

The cement slurries were conditioned at 190° F. for 30 minutes and then cured at 375° F. for 5 days. The mechanical properties including compressive strength, tensile strength, Young's Modulus, Poisson's Ratio, as well as the densities of the bottom, middle, and top portions of the set cement samples were determined according to the previously referenced procedures. The results are tabulated in Table 2.

TABLE 2

| Sample | Slurry Densities (ppg) | Curing Temp (° F.) | Compressive Strength (psi) | Tensile Strength (psi) | Young's Modulus (psi) | Poisson's Ratio | Density (ppg) | | |
|---|---|---|---|---|---|---|---|---|---|
| | | | | | | | Bottom | Middle | Top |
| 1 | 17.57 | 375 | 4571 | 396 | 1.76e+06 | 0.197 | 17.54 | 17.27 | 17.10 |
| 2 | 19.01 | 375 | 6315 | 560 | 1.70e+06 | 0.215 | 19.01 | 18.98 | 19.01 |
| 3 | 18.2 | 375 | 4864 | n/a | 1.67e+06 | 0.208 | 18.19 | 18.2 | 18.20 |

Referring to Table 3, the slurry density of all sections of Sample 2 was higher than that of Sample 1 even though the solid content of Samples 1 and 2 were the same. The Young's Modulus of all three samples was similar. The Poisson's Ratio for Samples 2 and 3 were higher than that of Sample 1, which without wishing to be limited by theory, may lead to better resiliency of the set cement material for those samples. The compressive strength of Sample 2 was higher than Sample 1 however; the Young's Modulus was comparable, which suggests that the set cement properties may be adjusted to meet a user-desired range by the inclusion of DSICs. Finally, the samples comprising DSICs (Samples 2 and 3) had less variation in the vertical density as indicated by the comparable density observed for the bottom, middle, and top sections of the sample when compared to similar sections for the cement sheath prepared from Sample 1.

Example 2

The pumpability of another cement composition (Sample 4) comprising a DSIC was compared to a cement composition lacking the DSIC (Sample 5). The DISC, designated Composite 3, was prepared by mixing 160 g of HI DENSE #3 with 48 g of WELLLIFE 665 at 170° C. using a BRABENDER mixer. Next, Composite 3 was grounded, the particle size distribution was determined using a Malvern test, which is a standard laser light scattering technique known to one of ordinary skill in the art with the aid of this disclosure. The results are tabulated in Table 3.

TABLE 3

| Mesh Size | % | Through/On | Actual Size (micron) |
|---|---|---|---|
| 12 | 100 | Through | 1700 |
| 16 | 59 | On | 1180 |

TABLE 3-continued

| Mesh Size | % | Through/On | Actual Size (micron) |
|---|---|---|---|
| 25 | 38 | On | 710 |
| 30 | 7.7 | On | 600 |
| 30 | 31.5 | Through | 600 |

Sample 4 was prepared by mixing water, Class H cement, SSA-1, Composite 3, HR-5, and D-AIR 3000L; while Sample 5 was prepared by mixing water, cement Class H, SSA-1, HI DENSE #3, WELLLIFE 665, HR-5, and D-AIR 3000L, all of the type previously described herein in the amounts indicated in Table 4. The densities of the slurries of Samples 4 and 5 were determined to be 17.02 ppg and 16.7 ppg respectively.

TABLE 4

|  | Sample 4 | Sample 5 |
|---|---|---|
| Water, % bwoc | 50.8 | 55.3 |
| Cement Class H, % bwoc | 100 | 100 |
| SSA-1, % bwoc | 35 | 35 |
| HI DENSE #3, % bwoc | — | 40 |
| WELLLIFE 665, % bwoc | — | 12 |
| Composite 3, % bwoc | 46.3 | — |
| HR-5, % bwoc | 0.2 | 0.2 |
| D-AIR-3000L, gal/sk | 0.03 | 0.03 |
| Density, ppg | 17.02 | 16.7 |

It was observed that Sample 4 had a pumpability that was comparable to that of Sample 5. As specified in the foregoing API Specification 10B, 22nd Edition, December, 1997 procedure, the thickening time was determined to be the elapsed time from the initial application of the temperature and the pressure to the time at which the slurry reaches a consistency deemed sufficient to make it unpumpable (i.e., greater than or equal to 70 Bc).

Example 3

The mechanical properties of two cements (Samples 7 and 9) comprising DSICs, Composites 4 and 5 respectively, were compared to cements lacking a DSIC (Samples 6 and 8). All of the samples contained water, Class H cement, SSA-1, HI DENSE #3, MICROMAX which is a cement additive commercially available from Halliburton Energy Services Inc., WELLLIFE 665, HALAD-344 which is a fluid loss additive commercially available from Halliburton Energy Services, Inc., HR-5, and D-AIR 3000L. Composite 4 was prepared by mixing Hi Dense #3 and WELLLIFE 665 (40:12 weight ratio), while Composite 5 was prepared by mixing MICROMAX and WELLLIFE 665 (20:12 weight ratio). The amount of each component in the four samples is indicated in Table 5 along with the density of the resultant slurry.

TABLE 5

|  | Sample 6 | Sample 7 | Sample 8 | Sample 9 |
|---|---|---|---|---|
| Water, % bwoc | 57.4 | 51 | 45 | 41.6 |
| Cement Class H, % bwoc | 100 | 100 | 100 | 100 |
| SSA-1, % bwoc | 35 | 35 | 35 | 35 |
| HI DENSE #3, % bwoc | 40 | — | — | — |
| MICROMAX, % bwoc | — | — | 20 | — |
| WELLLIFE 665, % bwoc | 12 | — | 12 | — |
| HALAD-344, % bwoc | 1 | — | 1 | — |
| Composite 4, % bwoc | — | 52 | — | — |
| Composite 5, % bwoc | — | — | — | 32 |
| HR-5, % bwoc | 0.25 | 0.2 | 0.25 | 0.2 |
| D-AIR-3000L, gal/sk | 0.03 | 0.03 | 0.03 | 0.03 |
| Density, ppg | 16.56 | 16.93 | 16.58 | 16.85 |

The cement slurries were conditioned at 190° F. for 30 minutes and then cured at 375° F. for 5 days and the compressive strength, tensile strength, Young's Modulus, and Poisson's Ratio for each sample was determined according to the previously referenced procedures. The results of these determinations are tabulated in Table 6.

TABLE 6

| Sample | Type | Density (ppg) | Compressive Strength (psi) | Tensile Strength (psi) | Young's Modulus (psi) | Poisson's Ratio |
|---|---|---|---|---|---|---|
| 6 | Control | 16.56 | 3797 | 419 | 1.18e+6 | 0.164 |
| 7 | Composite | 16.93 | 4552 | 468 | 1.20e+6 | 0.196 |
| 8 | Control | 16.58 | 7510 | 562 | 1.75e+6 | 0.194 |
| 9 | Composite | 16.85 | 5739 | 655 | 1.59e+6 | 0.202 |

Referring to Table 6, the mechanical properties for samples 6 and 7 were found to be comparable. This was also the case for samples 8 and 9. The samples (6 and 7 or 8 and 9) had identical amounts of high density additive and low density additive. The only difference being that in samples 7 and 9, the additives had been included in the compositions as a composite material. The comparable mechanical properties of the samples indicate that the function of additives was not affected by transforming them into a composite material.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, 95 percent, 96 percent, 97 percent, 98 percent, 99 percent, or 100 percent. Moreover, any numerical range defined by two R numbers as defined in the above is also specifically disclosed.

Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference in the Description of Related Art is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method of servicing a wellbore comprising
   placing a wellbore servicing fluid comprising a density segregation inhibitor composite having a specific gravity of from about 0.8 to about 4.5 into the wellbore; wherein the density segregation inhibitor composite comprises a high density additive associated with a low density additive; wherein the high density additive comprises barium sulfate, iron oxide, manganese oxide, or combinations thereof and wherein the low density additive has a phase transition temperature of from about 100° F. to about 700° F.

2. The method of claim 1 wherein the high density additive has a specific gravity of from about 2.6 to about 7.

3. The method of claim 1 wherein the high density additive comprises calcium carbonate, siderite, ilmenite, or combinations thereof.

4. The method of claim 1 wherein the low density additive has a specific gravity of from about 0.6 to about 2.6.

5. The method of claim 4 wherein the low density additive comprises an elastomer, thermoplastic elastomer, dienes, butadiene, isoprene, hexadiene, monoolefins, ethylene, butenes, 1-hexene, styrene butadiene random copolymer, styrene butadiene block copolymer, styrene butadiene styrene block copolymer, hydrogenated styrene butadiene rubber, or combinations thereof.

6. The method of claim 1 wherein the density segregation inhibitor composite is prepared by melt-mixing the high density and low density additive.

7. The method of claim 1 wherein the density segregation inhibitor composite is prepared by forming the low density additive in the presence of the high density additive.

8. The method of claim 1 wherein the density segregation inhibitor composite is prepared by chemically bonding the high density and low density additive.

9. The method of claim 1 wherein the density segregation inhibitor composite is present in the wellbore servicing fluid in an amount of from about 2 wt. % to about 70 wt. % based on the total weight of the wellbore servicing fluid.

10. The method of claim 1 wherein the wellbore servicing fluid comprises cement.

11. The method of claim 10 wherein the cement is present in the wellbore servicing fluid in an amount of from about 35 wt. % to about 80 wt. % based on the total weight of the wellbore servicing fluid.

12. The method of claim 10 wherein the wellbore servicing fluid has vertical variation in density when placed in the wellbore of from about 0.1% to about 5% when compared to an otherwise similar wellbore servicing fluid lacking the density segregation inhibitor composite.

13. The method of claim 10 wherein the wellbore servicing fluid has a compressive strength of from about 100 psi to about 15000 psi.

14. The method of claim 10 wherein the wellbore servicing fluid has a tensile strength of from about 10 psi to about 1500 psi.

15. The method of claim 10 wherein the wellbore servicing fluid has a Young's Modulus of from about $0.01 \times 10^5$ psi to about $4.6 \times 10^6$ psi.

16. The method of claim 10 wherein the wellbore servicing fluid has a Poisson's Ratio of from about 0.05 to about 0.4.

17. A method of inhibiting segregation of particles in a wellbore servicing fluid comprising preparing a composite material comprising a high density additive associated with a low density additive, wherein the low density additive comprises an elastomer which can increase in volume by greater than about 300% based on its original volume when contacted with a fluid and wherein the composite material has a specific gravity of from about 0.8 to about 4.5.

18. A method of servicing a wellbore comprising
placing a lightweight cement composition comprising a density segregation inhibitor composite into the wellbore; and
allowing the cement composition to set wherein the lightweight cement has a density of from about 5 ppg to about 12 ppg; wherein the density segregation inhibitor composite comprises a high density additive associated with a low density additive; and wherein the high density additive comprises barium sulfate, iron oxide, manganese oxide, or combinations thereof.

19. The method of claim 18 wherein the low density additive comprises a thermoplastic elastomer.

20. The method of claim 18 wherein the low density additive comprises a polyolefin grafted with polar monomers.

* * * * *